United States Patent
Zhang et al.

(10) Patent No.: US 11,283,705 B2
(45) Date of Patent: Mar. 22, 2022

(54) ANOMALY DETECTOR, ANOMALY DETECTION NETWORK, METHOD FOR DETECTING AN ABNORMAL ACTIVITY, MODEL DETERMINATION UNIT, SYSTEM, AND METHOD FOR DETERMINING AN ANOMALY DETECTION MODEL

(71) Applicant: Robert Bosch GmbH, Stuttgart (DE)

(72) Inventors: Dan Zhang, Leonberg (DE); Nikolaj Marchenko, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 4 days.

(21) Appl. No.: 17/123,404

(22) Filed: Dec. 16, 2020

(65) Prior Publication Data

US 2021/0184960 A1  Jun. 17, 2021

(30) Foreign Application Priority Data

Dec. 16, 2019 (EP) .................................. 19216426

(51) Int. Cl.
*H04L 12/26* (2006.01)
*H04L 43/50* (2022.01)
*H04L 43/0823* (2022.01)

(52) U.S. Cl.
CPC .......... *H04L 43/50* (2013.01); *H04L 43/0823* (2013.01)

(58) Field of Classification Search
CPC ..... H04L 67/12; H04L 1/0002; H04L 1/0041; H04L 1/18; H04L 5/0064; H04L 67/1097; H04L 1/0009; H04L 1/1874; H04L 67/306; H04L 12/66; H04L 29/00; H04L 43/045; H04L 47/122; H04L 67/10; H04L 2209/38; H04L 9/3239; H04L 63/1416; H04L 63/1425; H04L 67/125; H04L 67/16;

(Continued)

(56) References Cited

U.S. PATENT DOCUMENTS 10,616,257 B1\* 4/2020 Soulhi ................ H04L 41/5009
2015/0180785 A1\* 6/2015 Annamraju ............ H04L 47/25
370/230

(Continued)

FOREIGN PATENT DOCUMENTS

EP  3572986 A1  11/2019

OTHER PUBLICATIONS

3GPP, "3rd Generation Partnership Project: Technical Specification Group Services and System Aspects; Study on Communication for Automation in Vertical Domains", 2018, 178 pages.

(Continued)

*Primary Examiner* — Djenane M Bayard
(74) *Attorney, Agent, or Firm* — Michael Best & Friedrich LLP

(57) ABSTRACT

An anomaly detector (100) for detecting an abnormal activity in a telecommunications network. The anomaly detector (100) includes a receiver unit (102) configured to receive a plurality of network measurements (nm) in relation to the telecommunications network; a model-based mapping unit (104) configured to map the received plurality of network measurements (nm) via a machine-trained anomaly detection model (106) to an anomaly indicator (ai); and an output unit (108) configured to provide the anomaly indicator (ai), which indicates the abnormal activity in the telecommunications network.

15 Claims, 6 Drawing Sheets

(58) Field of Classification Search
CPC . H04L 67/2833; H04L 9/0643; H04L 1/0057; H04L 1/0076; H04L 1/187; H04L 2209/805; H04L 29/08783; H04L 29/08792; H04L 41/084; H04L 41/142; H04L 41/145; H04L 41/147; H04L 41/16; H04L 43/024; H04L 63/14; H04L 63/1433; H04L 63/1458; H04L 63/1466; H04L 63/20; H04L 67/04; H04L 67/20; H04L 67/2809; H04L 67/32; H04L 67/322; H04L 69/16; H04L 69/40
See application file for complete search history.

(56) References Cited

U.S. PATENT DOCUMENTS

| | | | | |
|---|---|---|---|---|
| 2016/0323163 | A1* | 11/2016 | Abdulnour | H04L 12/66 |
| 2017/0099099 | A1* | 4/2017 | Papakos | H04J 14/021 |
| 2017/0310546 | A1* | 10/2017 | Nair | H04L 41/0654 |
| 2019/0072601 | A1 | 3/2019 | Dzierwa et al. | |

OTHER PUBLICATIONS

Sun et al., "Machine Learning in future networks including IMT-2020: use cases", 2019, Q20/13 Geneva Meeting, 60 pages.
Fraunhofer Institute, "Use Case for Massive Wireless Sensor Networks Description | Factories of the Future", Fraunhofer Institute for Integrated Circuits, Aug. 2017, 7 pages.

* cited by examiner

ANOMALY DETECTOR, ANOMALY DETECTION NETWORK, METHOD FOR DETECTING AN ABNORMAL ACTIVITY, MODEL DETERMINATION UNIT, SYSTEM, AND METHOD FOR DETERMINING AN ANOMALY DETECTION MODEL

BACKGROUND OF THE INVENTION

The invention relates to an anomaly detector, an anomaly detection network a method for detecting an abnormal activity, a model determination unit, a system, and a method for determining an anomaly detection model.

With the increasing level of manufacturing digitalization, automation and flexibilization, the wireless communication networks start to play increasingly critical role in factory operation. One of the main concerns in such critical wireless networks is the intrusion of external unwanted entities as well as jamming of the wireless spectrum.

The problems of the prior art are solved by an anomaly detector, an anomaly detection network, a method for detecting an abnormal activity, a model determination unit, a system, and a method for determining an anomaly detection model.

SUMMARY OF THE INVENTION

A first aspect of the description is directed to an anomaly detector for detecting an abnormal activity in a telecommunications network. The anomaly detector comprises: A receiver unit configured to receive a plurality of network measurements in relation to the telecommunications network; a model-based mapping unit configured to map the received plurality of network measurements via a machine-trained anomaly detection model to an anomaly indicator; and an output unit configured to provide the anomaly indicator, which indicates the abnormal activity in the telecommunications network.

The detection of abnormal behavior is not restricted to certain measurements like frequency bands. Even complex intrusion and intelligent jamming will be detected. Moreover, complicated manual expert analysis of an attack is avoided as quickly activated countermeasures prevents further damage.

The described anomaly detection allows quick detection of abnormal activity in the telecommunications network. Subsequent reaction to any detected local network disturbances taking place in the telecommunications network is therefore possible. For example, wireless 5G networks in a factory being part of the telecommunications network benefit as abnormal activity caused by active intruders or infected abnormal acting network entities can be detected in order to take countermeasures.

Especially if network measurements are available from a radio part and a wired part of the telecommunications network, unknown correlation patterns in the measurements across RF measurements and wired measurements are detected.

In summary, telecom operators for private and public networks will benefit as the provided approach guarantees a reliable operation of the telecommunications network by reacting appropriately upon detecting an anomaly via the anomaly indicator.

An advantageous example is characterized by that the machine-trained anomaly detection model has been learned with training sets representing normal behavior of the telecommunications network or of a further telecommunications network.

By learning normal behavior, an advantage of the provided approach is that abnormal behavior can be detected independently of its nature or new attack style. Therefore, the provided approach is safety-proof with regard to future attack variations.

Advantageously, the same model can be used for different environment, for example a factory environment, an office environment, a city center environment, etc. However, it is also possible to determine a plurality of models, each one for a specific environment.

An advantageous example is characterized by that the anomaly detector comprises: a performance indicator mapping unit configured to map the received plurality of network measurements to at least one network performance indicator; and that the model-based mapping unit is configured to map the received plurality of network measurements via the machine-trained anomaly detection model and in dependence on the at least one network performance indicator to the anomaly indicator.

Advantageously, the at least one network performance indicator reduces the first dimension of the plurality of network measurements to a second dimension of at least one network performance indicator, wherein the second dimension is smaller than the first dimension. Consequently, the network performance indicator is a representation of the plurality of network measurements. For example, the performance indicator unit calculates a mean network data rate from a plurality of data rates.

An advantageous example is characterized by that the machine-trained anomaly detection model comprises an autoencoder.

By using an autoencoder the plurality of network measurements is mapped to a reconstruction of the plurality of network measurements. The autoencoder determines from a reduced encoding in form of a latent code a representation which is as close as possible to its original input in form of the network measurements.

Advantageously, the anomaly detection model has been trained to learn the normal operation of the telecommunications network absent abnormal behavior. So, the autoencoder inherently learns structures and features of a normal behavior. If abnormal activity occurs in the telecommunications network, the learned structures and features of the normal operation of the telecommunications network does not apply. This is, why the reconstruction of the autoencoder will depart significantly from the input network measurements in case of abnormal activity in the telecommunications network.

An advantageous example is characterized by that the model-based mapping unit determines a reconstruction of the plurality of network measurements, and wherein the output unit determines the anomaly indicator in dependence on a comparison of network measurements and in dependence on the reconstruction of network measurements.

For example, determining a measure of difference between the network measurements and the reconstruction provides the anomaly indicator. By comparing the present network measurements and the reconstruction, the model-based mapping unit is able to find anomalies. For example, if the anomaly indicator passes a threshold, the present state of network measurements is considered as abnormal activity and indicates an intrusion or some other adversarial attack.

An advantageous example is characterized by that the at least one network performance indicator is injected into the machine-trained anomaly detection model, wherein the injection position is arranged between an input layer and the output layer of the machine-trained anomaly detection model.

This kind of mapping is done at least partly parallel to a branch of the machine-trained anomaly detection model. At the injection position the network performance indicator is merged into the machine-trained anomaly detection model. The injection therefore advantageously helps to reconstruct the network measurements.

An advantageous example is characterized by that the machine-trained anomaly detection model comprises an encoder and a decoder, wherein the encoder provides a latent code at an output section of the encoder, and wherein an input section of the decoder receives the latent code and the at least one network performance indicator.

Advantageously the latent code and the at least one network performance indicator are merged at the input layer of the decoder in order to assist with the reconstruction of the network measurements.

An advantageous example is characterized by that the network measurements are received from a plurality of first network probes which are distributed in a radio part of the telecommunications network and from a second plurality of second network probes which are distributed in a wired part of the telecommunications network.

By receiving the network measurements from several network probes, the telecommunications network is represented. The network measurements from the wired part of the telecommunications network characterize the traffic patterns on the network devices and over time generally have to correlate with the behavior on the wireless medium. I.e., if there is a strong change on the radio spectrum usage, a strong change of the traffic on certain places in the wired factory network is expected as well.

An advantageous example is characterized by that at least one of the network probes is a radio frequency spectrum analyzer which is configured to determine at least one radio resource usage pattern of a radio telecommunications network part of the telecommunications network, wherein the radio resource usage pattern is received as a network measurement.

Advantageously, the radio resource usage pattern can be measured without being vulnerable to intrusion.

A second aspect of the description is directed to an anomaly detection network comprising the anomaly detector according to the first aspect and a/the plurality of network probes.

A third aspect of the description is directed to a computer-implemented method for detecting an abnormal activity in a telecommunications network, wherein the method comprises: receive a plurality of network measurements in relation to the telecommunications network; map the received plurality of network measurements via a machine-trained anomaly detection model to an anomaly indicator; and provide the anomaly indicator, which indicates the abnormal activity in the telecommunications network.

According to an advantageous example, the method is adapted to operate an anomaly detector according to the first aspect.

A fourth aspect of the description is directed to a model determination unit for determining an anomaly detection model, wherein the model determination unit comprises: an aggregator unit configured to aggregate training data comprising a plurality of network measurements of a telecommunications network; a training unit configured to train an anomaly detection model in dependence on the training data.

An advantageous example is characterized by that the model determination unit comprises: a first training unit being configured to train an encoder of the anomaly detection model in dependence on a first type of training set, wherein the first type of training set comprises: a plurality of network measurements and a prior distribution; and a second training unit being configured to train a decoder of the anomaly detection model in dependence on a second type of training set, wherein the second type of training set comprises: the plurality of network measurements, a latent code, and at least one network performance indicator.

Advantageously, the training of the autoencoder is executed by considering the at least one performance indicator in order to reconstruct the plurality of network measurements.

An advantageous example is characterized by that the training data, in particular the first and second type of training data, are collected during a normal operation of the telecommunications network absent anomalies.

Advantageously, the anomaly detection model is trained to learn the normal operation of the telecommunications network.

A fifth aspect of the description is directed to a system comprising an anomaly indicator according to the first aspect and the model determination unit according to the fifth aspect.

A sixth aspect of the description is directed to a computer-implemented method for determining an anomaly detection model, wherein the method comprises: aggregate training data comprising a plurality of network measurements of a telecommunications network; train the anomaly detection model in dependence on the training data.

According to an advantageous example the method is adapted to operate a model determination unit according to the fifth aspect.

DETAILED DESCRIPTION

Figure 1:
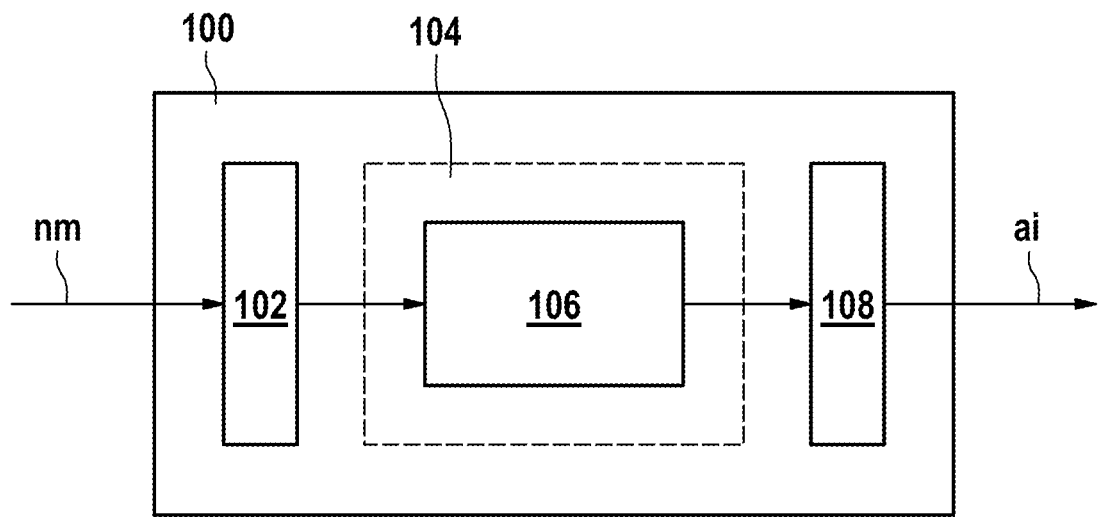
FIGS. 1 and 2 depict a schematic block diagram of an anomaly detector.

FIG. 1 depicts schematic block diagram of an anomaly detector 100 which is configured for detecting an abnormal activity in a telecommunications network. A receiver unit 102 is configured to receive a plurality of network measurements nm in relation to the observed telecommunications network. A model-based mapping unit 104 is configured to map the received plurality of network measurements nm via a machine-trained anomaly detection model 106 to an anomaly indicator ai. An output unit 108 is configured to provide the anomaly indicator ai, which indicates the abnormal activity in the telecommunications network.

The network measurements nm in relation to the telecommunications network comprise measurements like throughput, signal strength, QoS, radio usage, wire usage, etc. sensed by network probes which are distributed over the telecommunications network. The network measurements nm comprise network measurements from the radio domain and network measurements form wired domain.

The machine-trained anomaly detection model 106 has been learned with training sets representing normal behavior of the telecommunications network or of a further telecommunications network. The learning of the normal network behavior is therefore done by using, for example, data from radio frequency spectrum analyzers as well as the data from network probes deployed on wired network devices within the factory, such as routers, switches, edge servers, or end-devices. The network monitoring probes provide measurement values such as throughput, round-trip times, number of TCP/UDP/IP flows, jitter, packet inter-arrival times, packet sizes, etc.

A computer-implemented method for detecting the abnormal activity in the telecommunications network comprises: receive the plurality of network measurements nm in relation to the telecommunications network; map the received plurality of network measurements nm via the machine-trained anomaly detection model 106 to the anomaly indicator ai; and provide the anomaly indicator ai, which indicates the abnormal activity in the telecommunications network.

In the case the anomaly indicator ai indicates an anomaly, then at least one of the following actions is performed:
  The anomaly has to be evaluated by experts and identified if the anomaly is real or not.
  A reaction on the anomaly detection can be triggered automatically or by a human, e.g., turning off certain devices, changing networks configuration, until the issue is resolved.
  The data that lead to the anomaly detection can be used for training the model. This is particularly useful in case the anomaly is expected to appear in the future as well.

In case there is no anomaly detected, or after the evaluation, the anomaly is identified as false, again the data can be reused in the training part to improve the performance.

Figure 2:
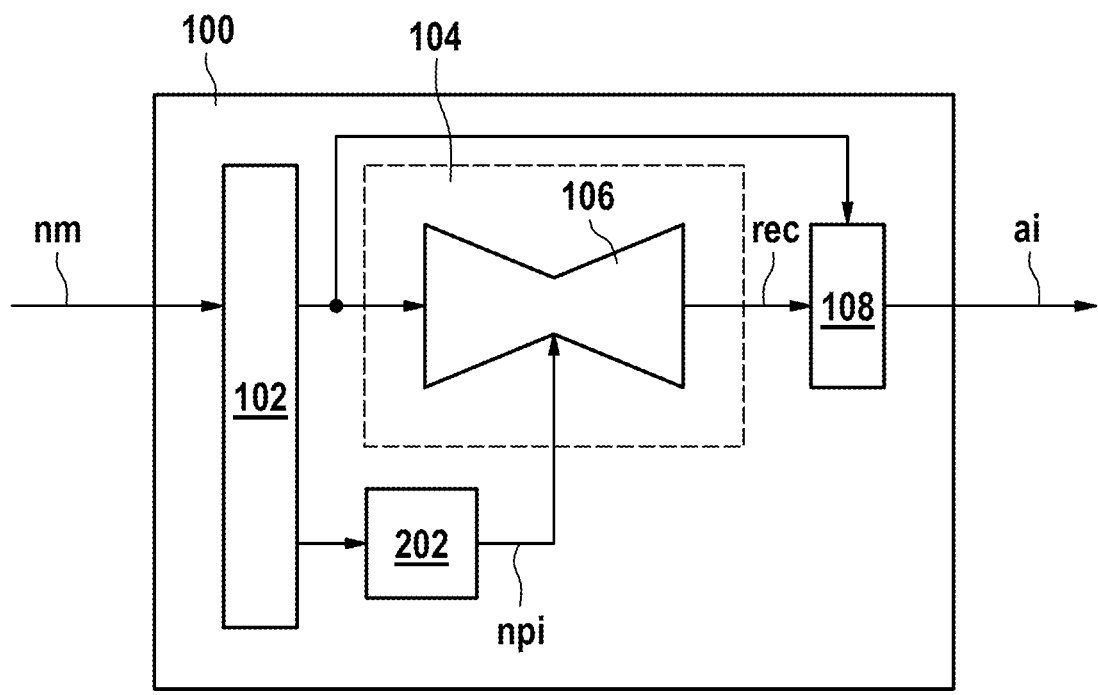

FIG. 2 depicts schematic block diagram of the anomaly detector 100 in more detail. A performance indicator mapping unit 202 is configured to map the received plurality of network measurements nm to at least one network performance indicator npi. The model-based mapping unit 104 is configured to map the received plurality of network measurements nm via the machine-trained anomaly detection model 106 and in dependence on the at least one network performance indicator npi to the anomaly indicator ai. The machine-trained anomaly detection model 106 comprises an autoencoder.

The model-based mapping unit 104 determines a reconstruction rec of the plurality of network measurements nm. The output unit 108 determines the anomaly indicator ai in dependence on a comparison of network measurements nm and in dependence on the reconstruction rec of network measurements nm.

The at least one network performance indicator npi is injected into the machine-trained anomaly detection model 106. The injection position is arranged between an input layer and the output layer of the machine-trained anomaly detection model 106.

The receiver unit 102 selects and distributes the network measurements nm to the model-based mapping unit 104 and the performance indicator unit 202. For example, the network measurements for the model-based mapping unit 104 and the performance indicator unit 202 are the same, differ or overlap partly.

Figure 3:
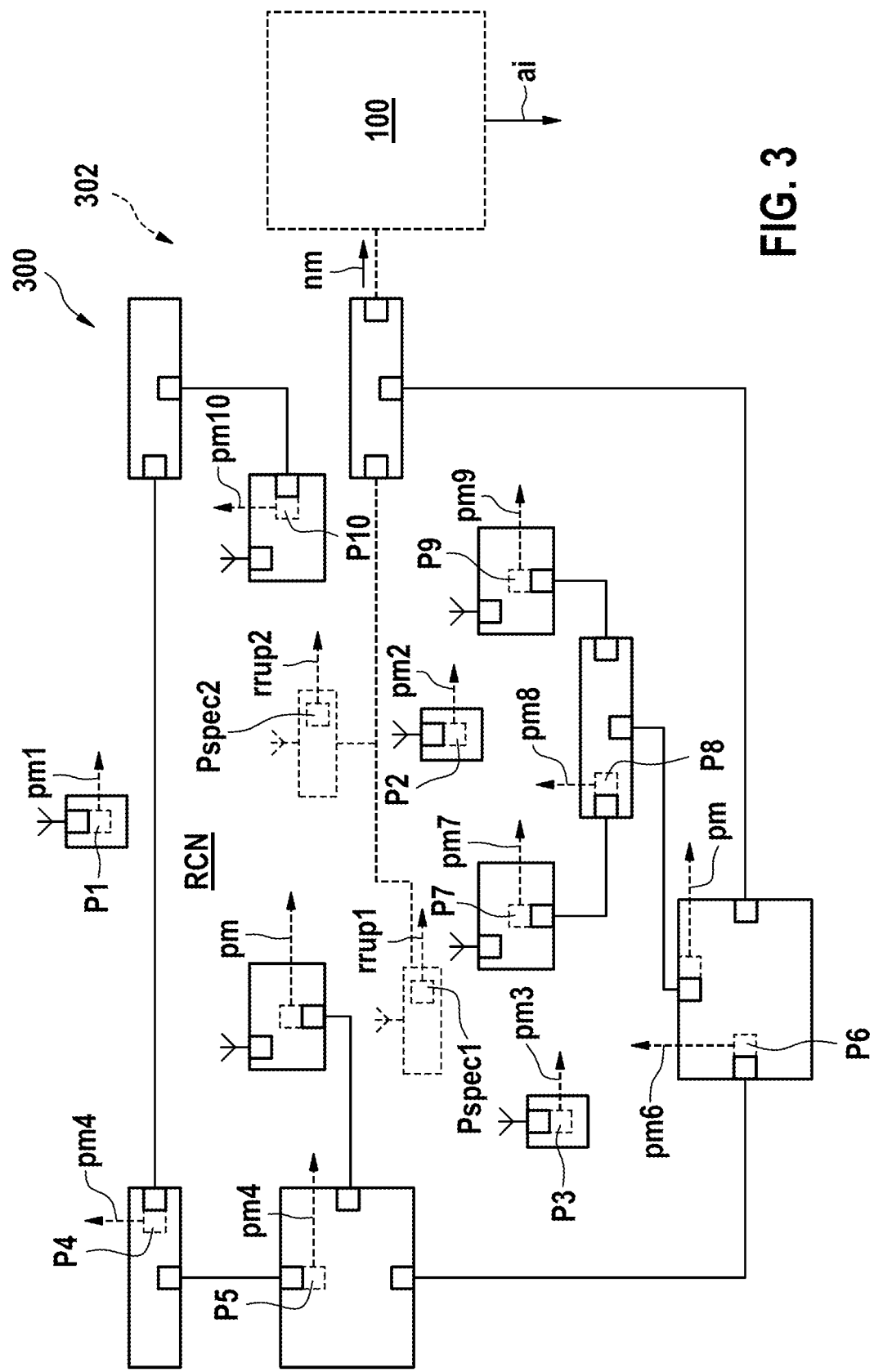
FIG. 3 depicts an exemplary telecommunications network.

FIG. 3 depicts an exemplary telecommunications network 300. The telecommunications network comprises a radio part and a wired part. The radio part is made up of wireless end devices and gateway devices to the wired part of the telecommunications network 300. The wired part of the telecommunications network 300 comprises servers, switches and the gateway devices.

An anomaly detection network 302 comprises the anomaly detector 100 and a plurality of network probes P. The network measurements nm are received from the plurality of different network probes P which are distributed over the telecommunications network 300.

Spread over the radio part of the telecommunications network 300, the anomaly detection network 302 comprises wireless network probes P1, P2, and P3. Spread over the wired part of the telecommunications network 300, the anomaly detection network 302 comprises wireless network probes P4 to P10. So, the probes P1 to P10 monitor the traffic across the corresponding network component in the telecommunications network 300.

Network probes Pspec1 and Pspec2 are radio frequency spectrum analyzers which are configured to determine at least one radio resource usage pattern rrup1, rrup2 of a radio telecommunications network part RCN of the telecommunications network 300. The radio resource usage pattern rrup1, rrup2 is received as a network measurement nm by the anomaly detector 100. The network probes Pspec1 and Pspec2 scan the usage of the wireless medium and particular frequency bands of interest.

Figure 4:
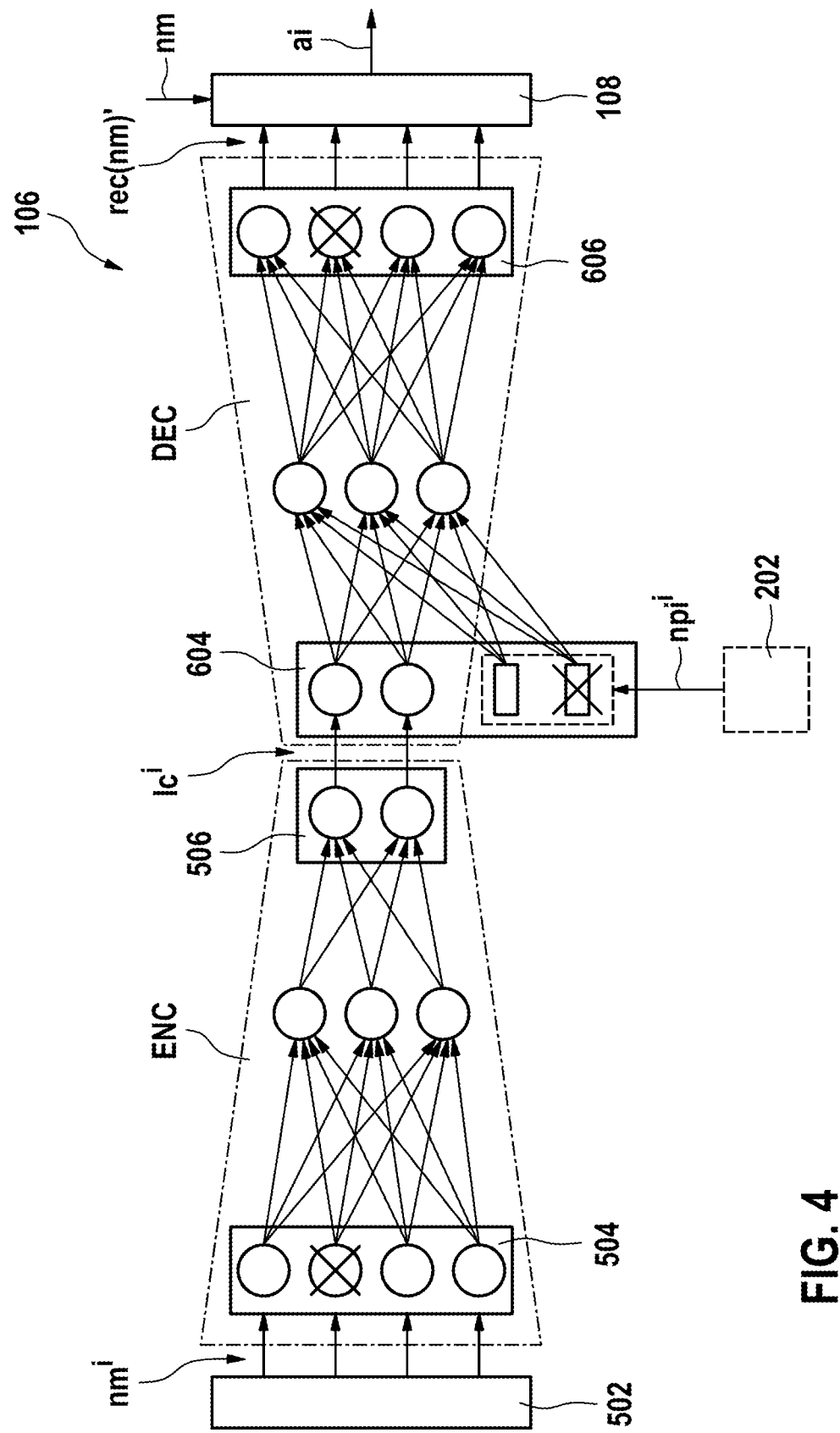
FIG. 4 depicts schematically the structure of an autoencoder.

FIG. 4 depicts schematically the structure of the autoencoder. The machine-trained anomaly detection model 106 comprises an encoder ENC and a decoder DEC. The encoder ENC provides a latent code lc at an output section of the encoder ENC. An input section of the decoder DEC receives the latent code lc and the at least one network performance indicator npi.

FIG. 4 depicts a schematic arrangement for determining a tensor representing the reconstruction rec(nm) of the network measurements nm via an encoder ENC comprising an artificial neural network and a decoder DEC comprising an artificial neural network, wherein the reconstruction rec(nm) is determined based on the network measurements nm. The encoder ENC and the decoder DEC together provide the autoencoder which represents the anomaly detection model 106 of the previous figures.

The encoder ENC is trained to efficiently compress the network measurements including for example radio measurement data (e.g., RF spectrum, signal strength map, etc.) into a latent code lc. The decoder DEC is then trained to reconstruct the radio measurement data from the latent code z. As the side information, the network performance indicators npi (e.g., throughputs, round-trip times, etc.) are be fed into the decoder DEC together with the latent code lc, assisting the reconstruction task of the decoder. Through the training process, the autoencoder learns the implicit structure behind the training data. This knowledge can then be used at the test time to detect anomalies. Namely, the structures of anomalies are unlikely to be the same as the training data. The reconstruction error of the autoencoder is therefore expected to be large.

At the test time, the autoencoder compresses the network measurements and then reconstructs them with the aid of the network performance indicator. The reconstruction error is measured and compared against a threshold. If the reconstruction error is larger than the threshold, the anomaly detector reports the presence of an anomaly. For designing threshold, the mean and variance of the reconstruction errors on the training set (normal cases) is computed. The threshold can then be set to be mean plus several multiples of the standard deviation.

Figure 5:
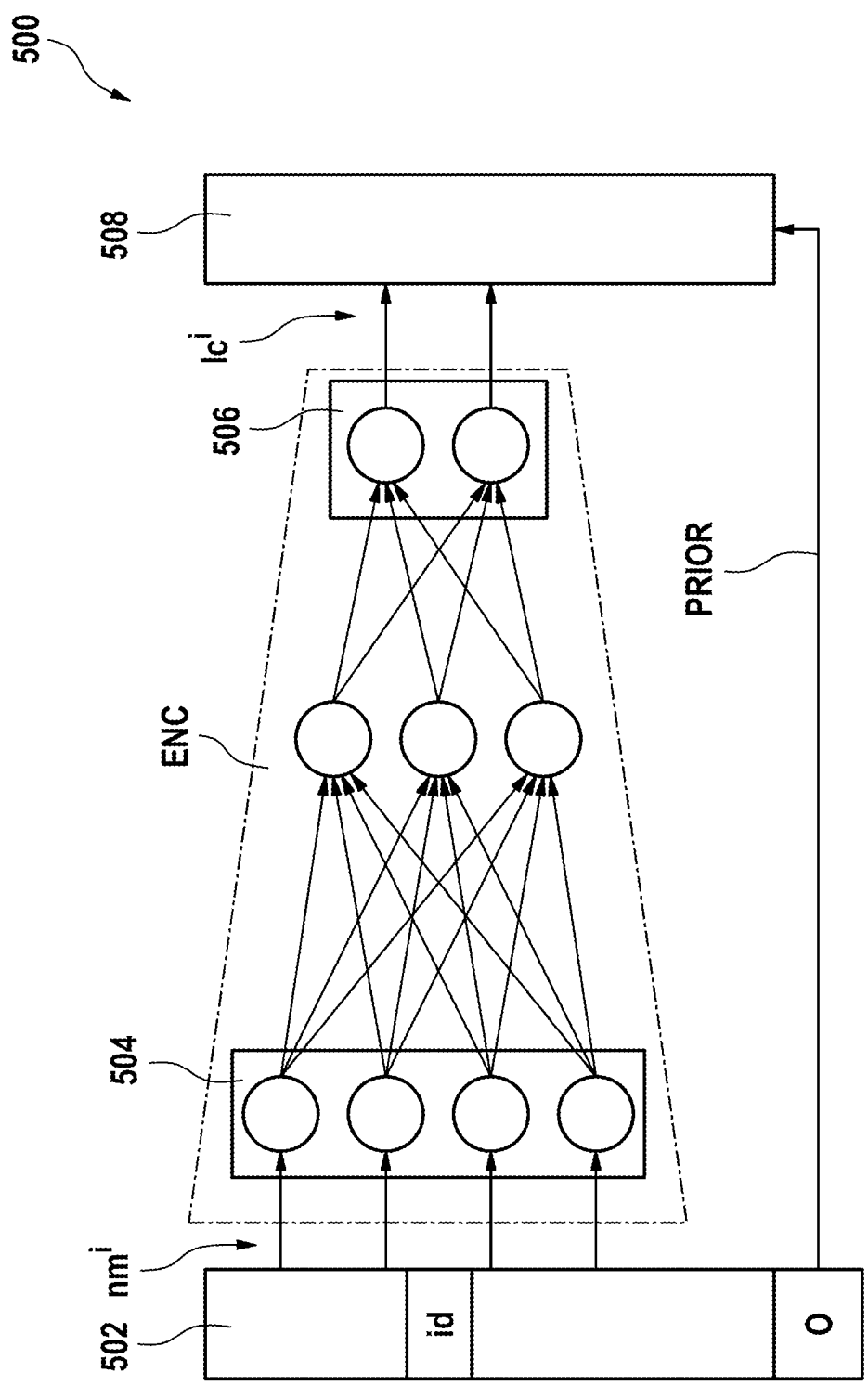
FIG. 5 depicts schematically a training of an encoder of the autoencoder.
Figure 6:
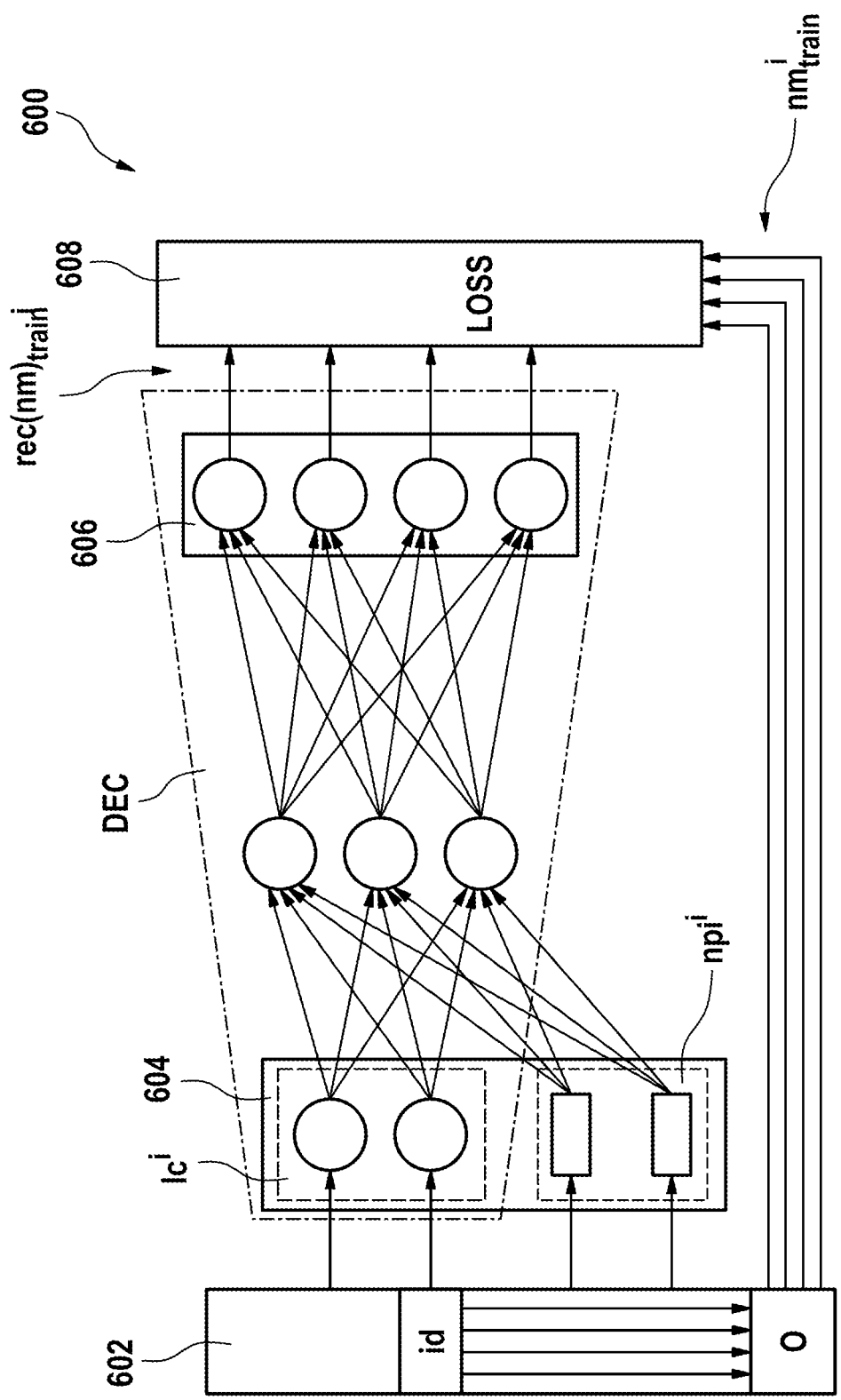
FIG. 6 depicts schematically a training of a decoder of the autoencoder.

An arrangement for the training is shown in FIGS. 5 and 6. First the training of the encoder ENC is referred to.

According to FIG. 5, the network measurements nm of a training set are provided in the form of input data id by an input interface 502 of the encoder ENC. The arrangement comprises the encoder ENC with an input layer 504. For a time step i, an input tensor $nm^i$ of the input data id is passed to the input layer 504. The input layer 504 is part of the input section. For input data id, the output O is determined in the form of a prior distribution PRIOR for the latent code lc in order to constrain the latent code lc. In time step i a tensor with observed values $lc^i$ of the latent code lc is determined. Each of the time series of input data id is assigned to one of input nodes. In a forward path of the encoder ENC, the input layer 504 is followed by at least one hidden layer. For the encoder ENC, a number of nodes of the at least one hidden layer is smaller than a number of the input nodes. This number is to be regarded as a hyper parameter. In the example, three nodes are provided in the hidden layer. The encoder ENC, for example, is learned by the gradient descent method in the form of backpropagation. In the forward path in the example, an output layer 506 is provided after at least one hidden layer. Prediction values are output at output layer 506 of the output section of the encoder ENC. In the example, an output node is assigned to each prediction value.

Besides the reconstruction loss, the latent code z of the autoencoder is constrained, avoiding the trivial solution that the encoder ENC and decoder DEC jointly form an identity mapping from the autoencoder input to its output. Selecting the prior distribution PRIOR=$p_{prior}$(lc) of the latent code lc, the encoder ENC is trained not only to efficiently encode the input for latter decoding, but also to match the distribution-$\int p_{enc}(rec|nm)p(nm)dnm=p_{enc}(lc)$ to the prior $p_{prior}(lc)$.

In each time step i a training function 508 constrains the learning process to training sets where the observed values $lc^i$ match the prior distribution PRIOR. In the example, this is fed to the training function 508 together with the column vector of the observed values $lc^i$ of the latent code lc. The training function 508 is designed in the example to determine a prediction error by means of a loss function LOSS, in particular by means of a mean square error, and to train the encoder ENC with it and by means of an optimizer, for example an Adam optimizer. The loss function LOSS is determined in the example depending on a deviation, in particular the Mean Square Error, from the values of the tensor of the observed values $lc^i$ and the prior distribution PRIOR.

The training is ended as soon as a fixed criterion is reached. In the example, the training is aborted if the loss does not decrease over several time steps, i.e. the Mean Square Error in particular does not decrease.

Test data is then entered into the encoder ENC trained in this way. The encoder ENC is generated by the training with the training data. The encoder ENC is evaluated with the test data, in particular with regard to the mean value μ and covariance Σ.

According to the arrangement shown in FIG. 4, the trained machine learned encoder ENC is used to provide a low-dimensional representation of the network measurements nm. The same data preprocessing steps are performed as for the training data. For example, scaling and a determination of input and output data takes place. This determination takes place in the example during the operation of the anomaly detector 100 of the previous figures.

As described for the training, for a time step i an input tensor $nm^i$ is passed to the input layer 504 for the input data id. Afterwards, in contrast to training, the decoder DEC receives the values $lc^i$ of the latent code lc.

According to FIG. 6 the training of the decoder DEC is depicted schematically. A tensor comprising values $lc^i$ of the latent code lc of a training set and with values $npi^i$ of the network performance indicator npi of the training set is provided in the form of input data id by an input interface 602 of the decoder DEC. The training arrangement comprises the decoder DEC with an input layer 604. For a time step i, an input tensor of the input data id is passed to the input layer 604. The input layer 604 is part of the input section. For input data id, the output O is known beforehand in form of the input tensor $nm^i$ of the network measurements nm of FIG. 5 referred to as the known training tensor $nm^i_{train}$. In time step i a tensor with observed values $rec(nm)^i$ of the reconstruction rec of the network measurements nm is determined. Each of the time series of input data id is assigned to one of input nodes. In a forward path of the decoder DEC, the input layer is followed by at least one hidden layer. For the decoder DEC, a number of nodes of the at least one hidden layer is greater than a number of the input nodes which receive the latent code. This number is to be regarded as a hyper parameter. In the example, three nodes are provided in the hidden layer. The decoder DEC, for example, is learned by the gradient descent method in the form of backpropagation.

In the forward path in the example, an output layer 606 is provided after at least one hidden layer. The tensor $rec(nm)^i$ is output at output layer 606 of the output section of the decoder DEC. In the example, an output node is assigned to each prediction value.

In each time step i the tensor $nm^i_{train}$ is determined in which the known values for the tensor $rec(nm)^i$ for this time step i are contained. In the example, this is fed to a training function 608 together with the column vector of the observed values $rec(nm)^i_{train}$ of the network measurements nm. The training function 608 is designed in the example to determine a prediction error by means of a loss function LOSS, in particular by means of a mean square error, and to train the decoder DEC with it and by means of an optimizer, for example an Adam optimizer. The loss function LOSS is determined in the example depending on a deviation, in particular the Mean Square Error, from the values of the tensor comprising the observed values $rec(nm)^i$ and the training tensor $nm^i_{train}$.

The training is ended as soon as a fixed criterion is reached. In the example, the training is aborted if the loss does not decrease over several time steps, i.e. the Mean Square Error in particular does not decrease.

Test data is then entered into the decoder DEC trained in this way. The decoder DEC is generated by the training with the training data. The decoder DEC is evaluated with the test data, in particular with regard to the mean value μ and covariance Σ.

According to the arrangement shown in FIG. 4, the trained machine learned decoder DEC is used to provide a reconstruction of the input data of the encoder ENC in dependence on the low-dimensional representation of the network measurements nm in form of the latent code lc and in dependence on the network performance indicator npi. The same data preprocessing steps are performed as for the training data. For example, scaling and a determination of input and output data takes place. This determination takes place in the example during the operation of the anomaly detector 100 of the previous figures.

The input data id are entered into the trained decoder DEC. Depending on this, prediction values are determined. A determination score is determined depending on this.

As described for the training, for a time step i a column vector is passed to the input layer 604. Afterwards, in contrast to training, the output unit 108 compares the reconstruction rec(nm) with the network measurements nm and determines the anomaly indicator ai.

In particular, instructions of a computer program implementing the described encoder ENC or the decoder DEC are provided for the implementation of the described procedures. Dedicated hardware can also be provided, in which a trained model is mapped.

Figure 7:
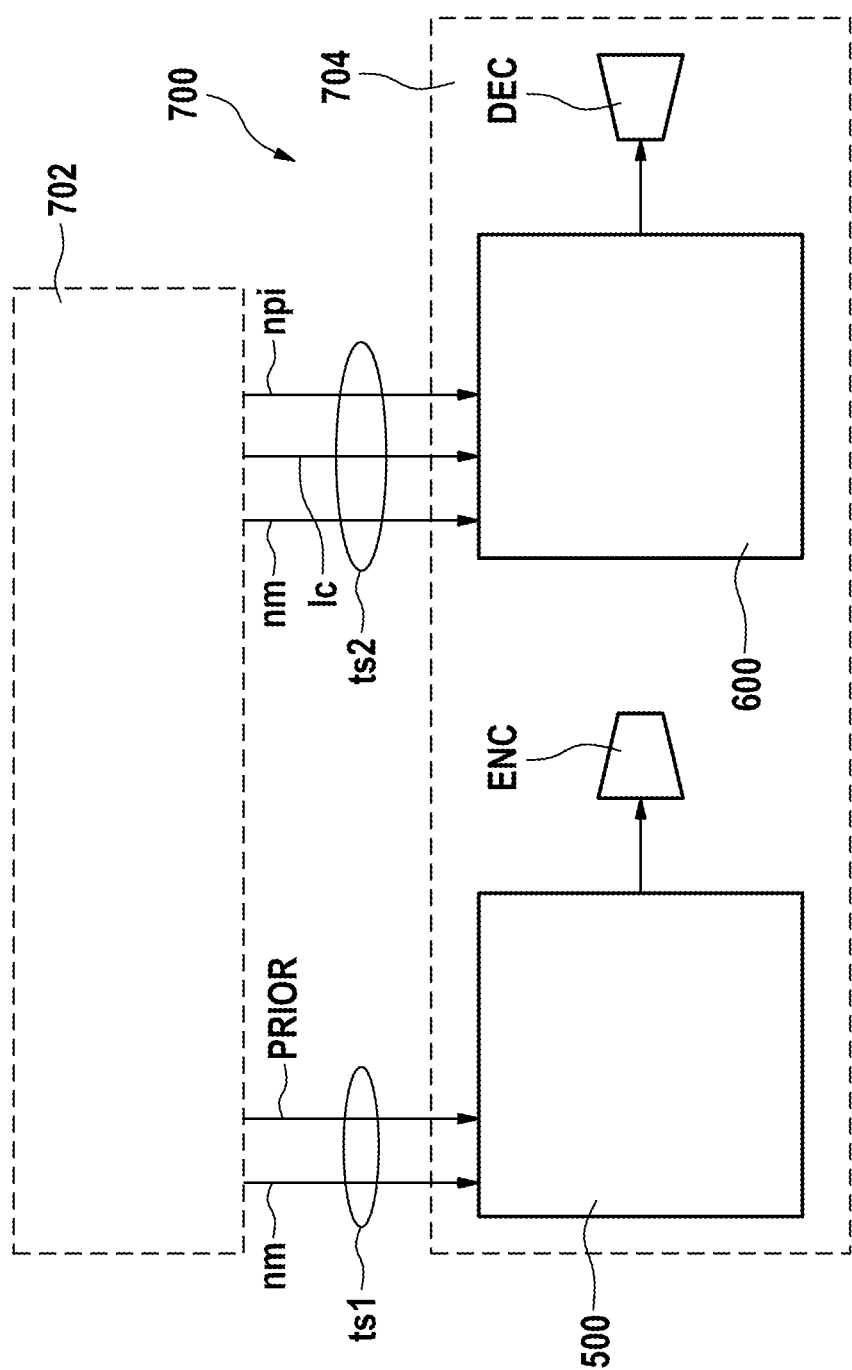
FIG. 7 depicts schematically a model determination unit.

FIG. 7 depicts schematically a model determination unit 700 for determining an anomaly detection model 106. An aggregator unit 702 is configured to aggregate training data comprising a plurality of network measurements nm of a telecommunications network 300. A training unit 704 is configured to train the anomaly detection model 106 in dependence on the training data.

The aggregator unit 702 collects training data. The training data, in particular the first and second type of training data td1, are collected during a normal operation of the telecommunications network 300 absent anomalies. Therefore, during the normal operation the most common and typical operation of the network and factory are done.

A first training unit 500 is configured to train an encoder ENC of the anomaly detection model 106 in dependence on a first type of training set ts1, wherein the first type of training set ts1 comprises: a plurality of network measurements nm and a prior distribution PRIOR.

A second training unit 600 being configured to train a decoder DEC of the anomaly detection model 106 in dependence on a second type of training set ts2, wherein the second type of training set ts2 comprises: the plurality of network measurements nm, a latent code lc, and at least one network performance indicator npi.

After the aggregation of the training data, the model is built via the training units 500 and 600. In an example, this step also includes the identification of primary information sources and their correlation.

A system comprises the anomaly indicator 100 of the previous figures and the model determination unit 700.

A computer-implemented method for determining the anomaly detection model 106 comprises: aggregate training data comprising the plurality of network measurements nm of the telecommunications network 300; and train the anomaly detection model 106 in dependence on the training data.

The invention claimed is:

1. An anomaly detector (100) for detecting an abnormal activity in a telecommunications network (300), wherein the anomaly detector (100) configured to:
   receive a plurality of network measurements (nm) in relation to the telecommunications network (300);
   map the received plurality of network measurements (nm) via a machine-trained anomaly detection model (106) to an anomaly indicator (ai); and
   provide the anomaly indicator (ai), which indicates the abnormal activity in the telecommunications network (300)
   wherein the at least one network performance indicator (npi) is injected into the machine-trained anomaly detection model (106), wherein the injection position is arranged between an input layer and the output layer of the machine-trained anomaly detection model (106).

2. The anomaly detector (100) according to claim 1, wherein the machine-trained anomaly detection model (106) has been learned with training sets representing normal behavior of the telecommunications network (300) or of a further telecommunications network.

3. The anomaly detector (100) according to claim 1, wherein the anomaly detector (100) is further configured:
   map the received plurality of network measurements (nm) to at least one network performance indicator (npi); and
   map the received plurality of network measurements (nm) via the machine-trained anomaly detection model (106) and in dependence on the at least one network performance indicator (npi) to the anomaly indicator (ai).

4. The anomaly detector (100) according to claim 3, wherein the anomaly detector (100) is further configured to determine a reconstruction (rec) of the plurality of network measurements (nm), and determine the anomaly indicator (ai) in dependence on a comparison of network measurements (nm) and in dependence on the reconstruction (rec) of network measurements (nm).

5. The anomaly detector (100) according to claim 1, wherein the machine-trained anomaly detection model (106) comprises an autoencoder.

6. The anomaly detector (100) according to claim 5, wherein the machine-trained anomaly detection model (106) comprises an encoder (ENC) and a decoder (DEC), wherein the encoder (ENC) provides a latent code (lc) at an output section of the encoder (ENC), and wherein an input section of the decoder (DEC) receives the latent code (lc) and the at least one network performance indicator (npi).

7. The anomaly detector (100) according to claim 1, wherein the network measurements (nm) are received from a plurality of first network probes (P) which are distributed in a radio part of the telecommunications network (300) and from a plurality of second network probes (P) which are distributed in a wired part of the telecommunications network (300).

8. The anomaly detector (100) according to claim 7, wherein at least one of the network probes (P) is a radio frequency spectrum analyzer which is configured to determine at least one radio resource usage pattern (rrup1, rrup2) of a radio telecommunications network part (RCN) of the telecommunications network (300), wherein the radio resource usage pattern (rrup1, rrup2) is received as a network measurement (nm).

9. An anomaly detection network (302) comprising the anomaly detector (100) according to claim 1 and a/the plurality of network probes (P).

10. A computer-implemented method for detecting an abnormal activity in a telecommunications network (300), the method comprising:
    receiving a plurality of network measurements (nm) in relation to the telecommunications network (300);
    mapping the received plurality of network measurements (nm) via a machine-trained anomaly detection model (106) to an anomaly indicator (ai); and
    providing the anomaly indicator (ai), which indicates the abnormal activity in the telecommunications network (300)
    wherein at least one network performance indicator (npi) is injected into the machine-trained anomaly detection model (106), wherein the injection position is arranged between an input layer and the output layer of the machine-trained anomaly detection model (106).

11. The computer-implemented method according to claim 10, wherein the method is adapted to operate an anomaly detector (100).

12. A system for determining an anomaly detection model (106), the system comprising:
- an aggregator unit (702) configured to aggregate training data comprising a plurality of network measurements (nm) of a telecommunications network (300);
- a training unit (704) configured to train the anomaly detection model (106) in dependence on the training data wherein at least one network performance indicator (npi) is injected into the machine-trained anomaly detection model (106), wherein the injection position is arranged between an input layer and the output layer of the machine-trained anomaly detection model (106).

13. The system according to claim 12, wherein the system is configured to:
- train an encoder (ENC) of the anomaly detection model (106) in dependence on a first type of training set (ts1), wherein the first type of training set (ts1) includes a plurality of network measurements (nm) and a prior distribution (PRIOR); and
- train a decoder (DEC) of the anomaly detection model (106) in dependence on a second type of training set (ts2), wherein the second type of training set (ts2) includes the plurality of network measurements (nm), a latent code (lc), and at least one network performance indicator (npi).

14. The system according to claim 12, wherein the training data are collected during a normal operation of the telecommunications network (300) absent anomalies.

15. A computer-implemented method for determining an anomaly detection model (106), wherein the method comprises:
- aggregating training data, the training data including a plurality of network measurements (nm) of a telecommunications network (300);

training the anomaly detection model (106) in dependence on the training data wherein at least one network performance indicator (npi) is injected into the machine-trained anomaly detection model (106), wherein the injection position is arranged between an input layer and the output layer of the machine-trained anomaly detection model (106).

* * * * *